United States Patent [19]

Aoki et al.

[11] Patent Number: 4,982,075
[45] Date of Patent: Jan. 1, 1991

[54] INFORMATION RECORDING MEDIUM WITH TRACK GROUP INDICATORS

[75] Inventors: Akio Aoki, Tokyo; Hideki Hosoya; Masahiko Enari, both of Yokohama, all of Japan

[73] Assignee: Canon Kabushiki Kaisha, Tokyo, Japan

[21] Appl. No.: 462,876

[22] Filed: Dec. 29, 1989

Related U.S. Application Data

[63] Continuation of Ser. No. 837,953, Mar. 10, 1986, abandoned.

[30] Foreign Application Priority Data

Mar. 14, 1985 [JP] Japan .................... 60-49391

[51] Int. Cl.⁵ .................................... G06K 19/06
[52] U.S. Cl. ........................ 235/470; 235/487; 235/494; 235/456
[58] Field of Search ............... 235/470, 456, 487, 494, 235/454; 369/275.3; 365/234, 215

[56] References Cited

U.S. PATENT DOCUMENTS

| | | | |
|---|---|---|---|
| 3,919,697 | 11/1975 | Walker | 369/44 |
| 4,094,010 | 6/1978 | Peperl et al. | 365/215 |
| 4,229,808 | 10/1980 | Hui | 365/234 |
| 4,362,928 | 12/1982 | Sheldon | 235/494 |
| 4,494,226 | 1/1985 | Hazel et al. | 369/275 |
| 4,562,577 | 12/1985 | Glover et al. | 369/54 |
| 4,571,714 | 2/1986 | Mathews et al. | 369/54 |
| 4,605,846 | 8/1986 | Duret et al. | 235/456 |
| 4,634,850 | 1/1987 | Pierce et al. | 235/487 |

FOREIGN PATENT DOCUMENTS

61-82286 12/1988 Japan .
WO85/02284 5/1985 World Int. Prop. O. .

*Primary Examiner*—Stuart S. Levy
*Assistant Examiner*—Hoa Nguyen
*Attorney, Agent, or Firm*—Fitzpatrick, Cella, Harper & Scinto

[57] ABSTRACT

An information recording medium comprises a plurality of record bands each having a plurality of information recording tracks arranged orthogonally to a direction of the track, and the record bands are arranged orthogonally to a direction of arrangement of the tracks. Identification fields are provided in the respective bands to allow identification of track groups.

4 Claims, 3 Drawing Sheets

INFORMATION RECORDING MEDIUM WITH TRACK GROUP INDICATORS

This application is a continuation of application Ser. No. 837,953 filed Mar. 10, 1986 now abandoned.

BACKGROUND OF THE INVENTION

The present invention relates to an information recording medium, and more particularly to a format of a recording area thereof.

Many optical recording and reproducing apparatus which use recording media such as optical files or compact disks have recently been proposed, and card-like optical recording media (optical cards) which are superior in point of the ease of carrying and of their large memory capacity have also been proposed.

FIG. 1A shows a plan view of a recording format of a prior art optical card and FIG. 1B shows a partial enlarged view thereof. A recording area 2 is provided on an optical card 1 which is a recording medium and has a plurality of bands 3 arranged therein. Each of the bands 3 has a number of tracks (4600 tracks in the illustrated embodiment) arranged therein and each track 4 has an information capacity of several tens to 100 bits (46 bits in the illustrated embodiment). As shown in FIG. 1B, each track 4 comprises a start bit 20, a stop bit 21, a track number field 22 and a data field 23 (including a parity bit for error correction). One track comprises 46 bits of which 5 bits are used for the track number area.

The bands are separated by reference lines (R lines) 5, and a home position HP which is an access reference position is formed at a corner of the optical card. An arrow A indicates a direction of movement of the optical card 1 in a reproduction mode.

FIG. 2 shows a configuration of an optical card reproducing apparatus. The optical card 1 is movable in the direction of the arrow A by means of a rotation mechanism 6. Information recorded on the optical card 1 is read and reproduced by an optical head 11 track by track. A light beam from a light source 7 such as an LED is condensed by a lens system 8 to illuminate the track 4 on which the information is recorded. An image of the illuminated track 4 is focused by a focusing optical system 9 on a linear array sensor 10 which produces an electrical signal representing the information recorded on the track 4.

In order to access a desired track on the optical card 1, the optical head 11 is moved in a direction of an arrow C (see FIG. 1A) with the home position HP being a reference position. The optical head 11 selects the band 3 to which the desired track belongs by counting the R lines 5 and stops at the desired band. Then, the optical card 1 is moved by the rotation mechanism 6 in the direction of the arrow A, and the information on the desired track is read.

When the track number field 22 comprises 5 bits, only 32 combinations are possible and all of the 4600 tracks in one band cannot be selected. In order to select the 4600 tracks, 13 bits are required for the track number field but they occupy a large portion of total of 46 bits. Thus, redundancy is high. Further, as the number of bits in the track number field 22 increases, the probability of misdetection of the track number due to dust or defect increases accordingly.

The correct detection of the track number is very important because it is a basic requirement for reproduction. In a recording medium like the optical card in which the number of bits in one track cannot be very large, it is very important to reduce the redundancy to increase the data capacity.

SUMMARY OF THE INVENTION

It is an object of the present invention to provide an information recording medium which permits selection of a desired track with a small number of bits in a track number field.

The information recording medium of the present invention comprises a plurality of bands each having a plurality of tracks containing information, arranged orthogonally to a direction of arrangement of the tracks, and identification fields for identifying groups of tracks, which fields are formed between the tracks.

With this arrangement, the redundancy is reduced and the reliability with which it is possible to detect the track is improved.

DESCRIPTION OF THE PREFERRED EMBODIMENTS

Figure 1A:
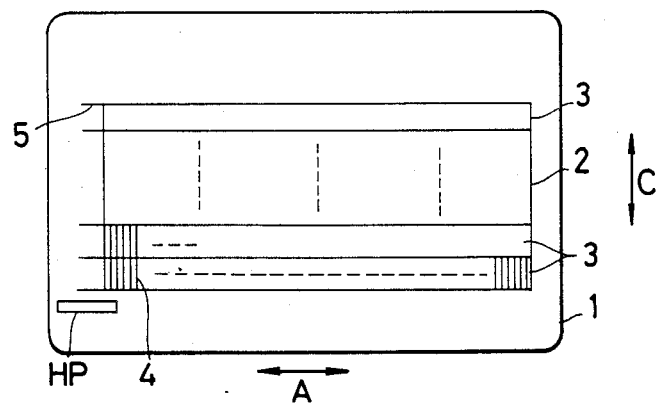
FIG. 1A shows a plan view of a recording format of a prior art optical card.
Figure 1B:
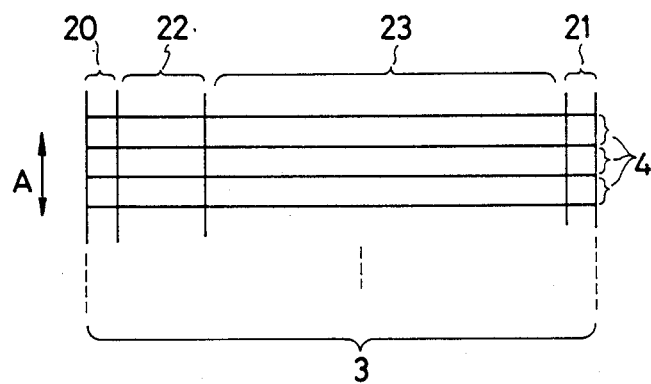
FIG. 1B shows a partial enlarged view of the recording format of FIG. 1A.
Figure 2:
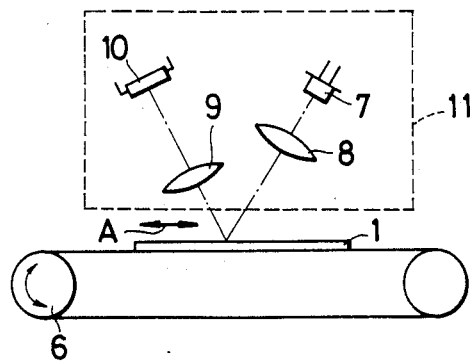
FIG. 2 shows a configuration of an optical card reproducing apparatus.
Figure 3:
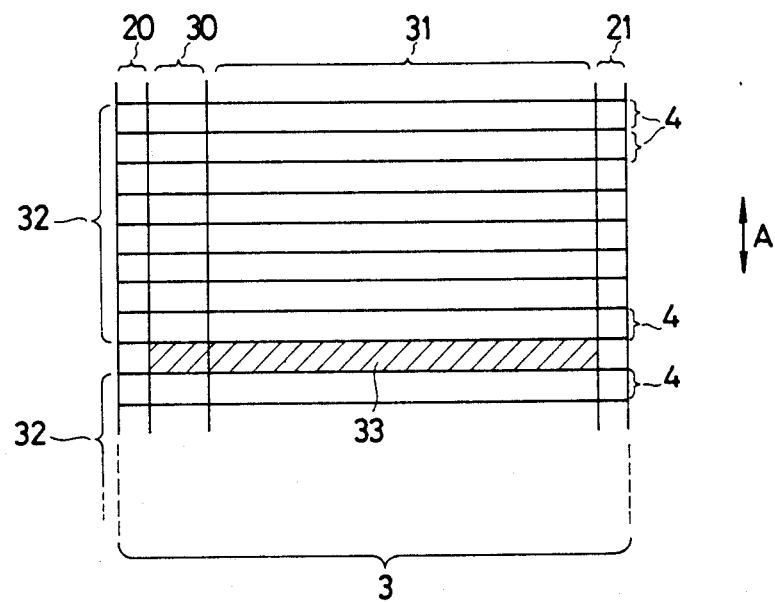
FIG. 3 shows a partial enlarged view of a recording format in one embodiment of an information recording medium of the present invention.

FIG. 3 shows a partial enlarged view of a recording format in one embodiment of an information recording medium of the present invention. Each track 4 comprises a start bit 20, a stop bit 21, a 3-bit track number field 30 and a data field 31. In the present embodiment, eight such tracks 4 form a group of tracks, or track group 32. To identify and select a track within the group of tracks, the track number field 30 may have as few as 3 bits in this embodiment.

A plurality of such track groups 32 are arranged, with identification fields 33 (the hatched area in FIG. 3) for identifying the track groups being interposed therebetween, to form a band 3. A plurality of such bands 3 are arranged longitudinally of the tracks 4 to form a record area 2. Identification fields formed in each record band divide the information tracks into no more than $2^n$ or $2^n$ track groups, where n is the number of bits of each track number field.

In the present embodiment, consecutive bits having the same value (all "1" or all "0") are recorded in the track group identification field 33. Alternatively, in the identification field 33 may be recorded a series of consecutive bits of the same value which exceed in number than the maximum number of consecutive bits of the same value which may appear in the track number field 30 and the data field 31. For example, where a 4/5 NRZI modulation system is employed, a datum in the form of a hexadecimal number is 4/5 converted and then NRZI modulated. The signal thus modulated includes only T, 2T and 3T signals, where T is a minimum reversal interval. In other words, when recording is conducted using this modulation system, four or more consecutive bits of the same value ("1" or "0", i.e., four or more consecutive 1's or four or more consecutive 0's) do not appear on the recording medium. Accordingly, where the data is recorded in the data field by the 4/5 NRZI modulation system, four or more consecutive bits of the same value may be arranged in the identification field 33. Thus, when the reproducing apparatus reads the identification field 33 for the purpose of identifying the identification field as such, information which is not contained in the data field 31 is detected, indicating that it is the identification field 33 which is being read, permitting the field to be counted (see below as to the purpose of counting the identification fields).

A method for selecting the track by using such a recording format is now explained. When the optical head 11 reaches the band 3 to which the desired track belongs, the tracks are sequentially sanned by relative movement in the direction of the arrow A. The number of times of occurrence of a field in which the number of consecutive bits of the same value is larger than the maximum number, that is, the identification field 33, is counted, and this count, combined with the number contained in the track number field 30 of the track 4, makes it possible to select the desired track in the track group 32.

Figure 4:
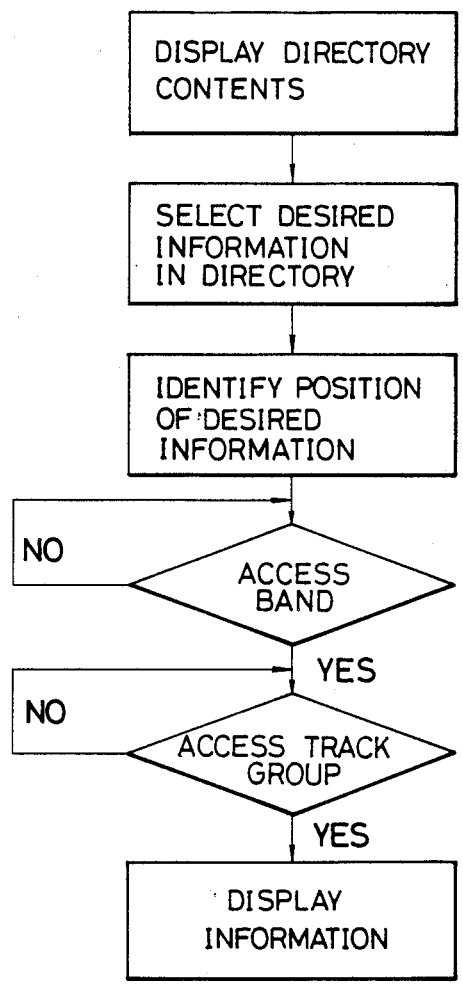
FIG. 4 shows a flow chart for random access to the information recording medium of the present invention.

One procedure for randomly accessing the information recording medium having such a format is described. FIG. 4 shows a flow chart for the random access. The information recording medium 1 is first loaded to the reader and a directory area written in the recording medium is read and displayed on a CRT. The directory contains information recorded on the medium in a form of table of contents. The desired information is selected from the directory and the process of accessing the location at which the information is stored is started. The directory also contains information on band 3 and track group 32 in the band 3 at which the desired information is stored. Thus, when the desired information is selected, the location at which the information is recorded is determined. The optical head 11 reads the band number assigned to the band, and when the desired band is reached, the optical head is then moved in the direction of arrangement of the track 4. The number of times of occurrence of the identification area 33 is counted by the counter so that the desired track group is accessed. If the directory contains information on the number of track group 32 of the desired information counted from one side of the band 3, such access is permitted.

If the bits of the same value are recorded throughout the identification field 33, the track groups 32 can be identified without being affected by dust or defects. One entire track 4 may contain bits of the same value to form the identification field 33. Since the number of bits of the same value recorded in the identification field need only be larger than the maximum number of consecutive bits of the same value in the track number field 30 and the data field 31, however, the remaining area of the track in which the identification field 33 is formed may be used as a data area 31.

In the present embodiment, one track group comprises eight tracks, although the number of tracks in one track group may be appropriately determined taking the number of bits in the track number field 30 into account.

The present invention is applicable not only to the optical card but to any information recording medium having a record area including tracks and bands.

As described hereinabove, the information recording medium 1 of the present invention has the track group identification fields 33 between the track groups 32. Thus, the track can be exactly identified and the size of the track number field 30 for the track 4 can be reduced. Accordingly, the redundancy is reduced and the effect of dust or defects is reduced.

What we claim is:

1. An information recording medium comprising:
    a plurality of bands arranged in a first direction, each of said bands being constituted by a plurality of information tracks arranged in a second direction perpendicular to the first direction and separated into a plurality of track groups in each of said bands, said plurality of bands being respectively separated along the first direction; and
    an identification field in said bands, said identification field being arranged between said plurality of track groups in such a manner that said plurality of track groups are separated in said second direction.

2. An information recording medium comprising:
    a plurality of bands arranged in a first direction, each of said bands being constituted by a plurality of information tracks having at least a track number field and a data information field, said information tracks being arranged in a second direction perpendicular to said first direction and separated into a plurality of track groups in each of said bands, said plurality of bands being respectively separated along the first direction; and
    an identification field in said bands, said identification field being arranged in such a manner that said plural track groups are separated in said second direction,
    wherein said track groups are constituted by tracks numbering no more than $2^n$, where n is the number of bits of each of said track number fields.

3. An information recording medium comprising:
    a plurality of bands arranged in a first direction, each of said bands being constituted by plural information track groups arranged in a second direction perpendicular to said first direction in said bands, said plurality of bands being respectively separated along the first direction; and
    an identification field for identifying said track groups from those adjacent to said track groups in said bands,
    wherein said track groups are constituted by information tracks numbering no more than $2^n$ and each of said information tracks has a track number field constituted by n bits, n being a positive integer.

4. An information recording medium according to claim 1, wherein information is recorded in said information tracks by use of a predetermined modulation process, and wherein said identification field includes a pattern other than that which is generated by said predetermined modulation process, said pattern being information for indicating said identification field.

* * * * *

UNITED STATES PATENT AND TRADEMARK OFFICE
CERTIFICATE OF CORRECTION

PATENT NO. : 4,982,075
DATED : January 1, 1991
INVENTOR(S) : AKIO AOKI ET AL.

It is certified that error appears in the above-identified patent and that said Letters Patent is hereby corrected as shown below:

COLUMN 1

Line 52, "Theoptical" should read --The optical--.

COLUMN 2

Line 41, "track" should read --"track--.
    Line 42, "group 32." should read --group", 32.--.

Signed and Sealed this

Twentieth Day of October, 1992

Attest:

DOUGLAS B. COMER

*Attesting Officer*       *Acting Commissioner of Patents and Trademarks*